(12) United States Patent
Huke et al.

(10) Patent No.: US 11,763,624 B2
(45) Date of Patent: Sep. 19, 2023

(54) AR VR IN-PLAY WAGERING SYSTEM

(71) Applicant: AdrenalineIP, Washington, DC (US)

(72) Inventors: Casey Alexander Huke, Washington, DC (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 130 days.

(21) Appl. No.: 17/091,427

(22) Filed: Nov. 6, 2020

(65) Prior Publication Data

US 2022/0092913 A1    Mar. 24, 2022

Related U.S. Application Data

(60) Provisional application No. 63/081,575, filed on Sep. 22, 2020.

(51) Int. Cl.
| | |
|---|---|
| A63F 9/24 | (2006.01) |
| A63F 11/00 | (2006.01) |
| G06F 13/00 | (2006.01) |
| G06F 17/00 | (2019.01) |
| G07F 17/32 | (2006.01) |
| G06T 19/00 | (2011.01) |
| G06Q 50/34 | (2012.01) |

(52) U.S. Cl.
CPC ......... *G07F 17/3211* (2013.01); *G06Q 50/34* (2013.01); *G06T 19/006* (2013.01); *G07F 17/323* (2013.01); *G07F 17/3244* (2013.01); *G07F 17/3288* (2013.01)

(58) Field of Classification Search
CPC ............................ G07F 17/32; G07F 17/3213
USPC .............................. 463/20, 22, 25, 30, 31, 39
See application file for complete search history.

(56) References Cited

U.S. PATENT DOCUMENTS

| | | | |
|---|---|---|---|
| 6,031,545 A * | 2/2000 | Ellenby | H04N 5/23216 |
| | | | 345/632 |
| 10,304,278 B2 | 5/2019 | Lyons et al. | |
| 10,706,661 B2 | 7/2020 | Froy | |
| 2008/0153579 A1 | 6/2008 | Brenner et al. | |
| 2010/0259005 A1 | 10/2010 | Simon | |
| 2013/0157735 A1 | 6/2013 | Amaitis et al. | |
| 2014/0221065 A1 | 8/2014 | Strause et al. | |
| 2020/0175818 A1 | 6/2020 | Joao | |

FOREIGN PATENT DOCUMENTS

WO    2019/244151 A1    12/2019

OTHER PUBLICATIONS

International Search Report and Written Opinion dated Dec. 16, 2021 in corresponding International Patent Application No. PCT/US2021/050802; 11 pages.

* cited by examiner

*Primary Examiner* — Adetokunbo O Torimiro
(74) *Attorney, Agent, or Firm* — Maier & Maier, PLLC

(57) ABSTRACT

A system for play by play wagering on a live sporting event through an augmented reality or virtual reality device. Users of a play by play wagering network can place wagers on the outcome of individual plays in a live sporting event that are displayed based on the players or elements of the live event that are in the point of view of the user's virtual or augmented reality device. Selected wagers can be augmented with multipliers based on user's manipulation of the augmented or virtual reality environment, such as running a path through the virtual field that they believe a player will take.

11 Claims, 5 Drawing Sheets

Fig. 5

| Play Type | Distance Multiplier | | | | Path Multiplier | | | |
|---|---|---|---|---|---|---|---|---|
| | +100 | +50 | +25 | | +100 | +50 | +25 | |
| Run | <1 yards | <2 yards | <3 yards | | <2 yards | <3 yards | <4 yards | |
| Pass | <1 yards | <3 yards | <4 yards | | <2 yards | <3 yards | <4 yards | |
| Punt | <3 yards | <6 yards | <9 yards | | <3 yards | <6 yards | <9 yards | |
| ... | | | | | | | | |
| Return | <1 yards | <3 yards | <4 yards | | <3 yards | <6 yards | <9 yards | |

Fig. 6

| User | Game | Play | Wager | Odds | Predicted Outcome | Path |
|---|---|---|---|---|---|---|
| Joe Smith | NFL-Chicago at Green Bay | 62 | $10 | +150 | Pass | JS-Path.dat |
| Frank Jones | NFL-Chicago at Green Bay | 62 | $50 | +150 | Pass | NA |
| Susan Robinson | NFL-Chicago at Green Bay | 62 | $100 | +300 | Run | SR-Path.dat |

AR VR IN-PLAY WAGERING SYSTEM

FIELD

The present disclosure is generally related to wagering on live sporting events. Specifically play by play wagering, and its interaction with augmented reality and virtual reality devices.

BACKGROUND

Current sports betting platforms provide numerous different ways to wager on entire sporting events, or individual aspects or portions of those events. However, they do not provide a manner of wagering on the movements of players or objects in the field of play.

Augmented reality and virtual reality devices, and the content for them, continue to improve. Their use with live sporting events is evolving, but largely remains a novelty and lacks a manner of keeping the user engaged with the event in a manner that is novel to the new interface type.

When wagering on a sporting event or portion of a sporting event, having the actual result relative to the user's wager is desirable. If the wager is based on the path of player or object in the field of play, there is no current product that will compare the projected path to the wagered upon path.

SUMMARY

The embodiments include methods, systems, and apparatus for in-play wagering using augmented reality and virtual reality. One embodiment incudes a system for wagering on a path of a player or object in a field of play during a single play of a live event through at least one of an augmented reality or virtual reality device, including a wagering network that hosts in-play wagering on live sporting events; at least one of a virtual reality or augmented reality device; a live sporting event, where the live sporting event is displayed through the device; at least two wagers are provided by the wagering network for a single play in the live event and available wagers are filtered by the point of view of the at least one virtual reality or augmented reality device; a placement of an initial wager based on at least one of the at least two wagers provided; at least one additional wager is provided based on movement of one or more elements in the live event that is contingent upon the initial wager being correct; a placement of a second wager based on a predicted movement of the one or more elements in the live action event; and a comparison of a predicted movement of the one or more elements to an actual movement made in the live event and payment for a successful wager.

Another exemplary embodiment includes augmented and/or virtual reality wagering device, including a mobile device running augmented and/or virtual reality software; one or more elements participating in a live event; a display of one or more wagering options in augmented and/or virtual reality based on the point of view of the mobile device with respect to the live event and the one or more elements participating in the live event; and a wagering module that facilitates placement of wagers for the live event.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 5 illustrates a multiplier database, according to an embodiment.

FIG. 6 illustrates a current wager database, according to an embodiment.

DETAILED DESCRIPTION

Figure 1:
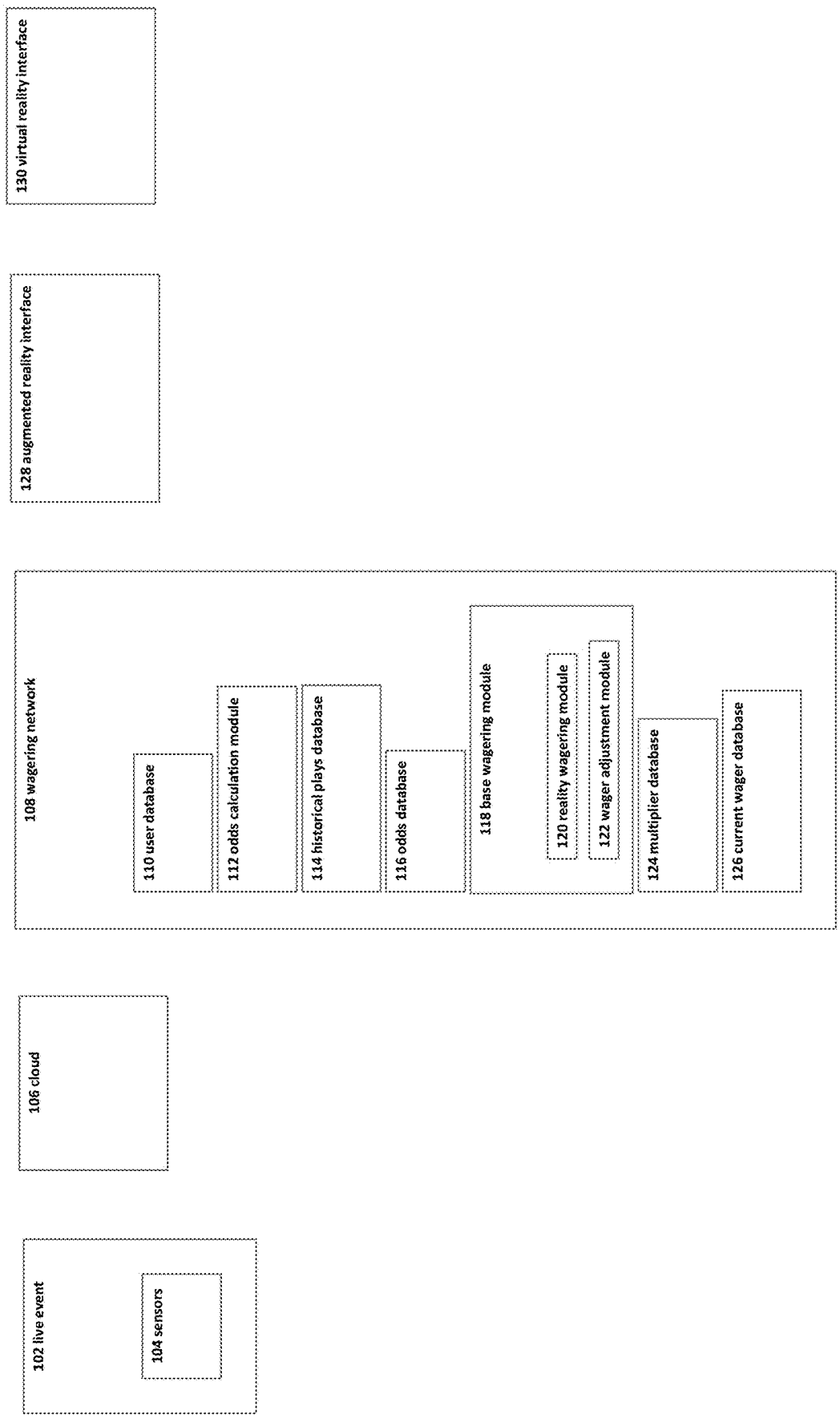
FIG. 1 illustrates an AR VR in-play wagering system, according to an embodiment.

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein, the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allow customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an AR VR In-Play Wagering System. This system includes a live event 102, for example a sporting event such as a football game, basketball game, baseball game, hockey game, tennis match, golf tournament, eSports or digital game, etc. The live event can include some number of actions or plays, upon with a user or bettor or customer can place a bet or wager, typically through an entity called a sportsbook. There are numerous types of wagers the bettor can make, including, a straight bet, a money line bet, a bet with a point spread or line that bettor's team would need to cover, if the result of the game with the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting, by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a bettor to bet on both sides at different point spreads in order to middle and win both bets. Sportsbooks will often offer bets on portions of games, such as first half bets and half-time bets. Additionally, the sportsbook can offer futures bets on live events in the future. Sportsbooks need to offer payment processing services in order to cash out customers. This can be done at kiosks at the live event or at another location.

Further, embodiments may include a plurality of sensors 104 that may be used, such as motion sensors, temperature sensors, humidity sensors, cameras such as an RGB-D Camera which is a digital camera providing color (RGB) and depth information for every pixel in an image, microphones, radiofrequency receiver, a thermal imager, a radar device, a lidar device, an ultrasound device, a speaker, wearable devices etc. Also, the plurality of sensors may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that provides statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, often over Internet and relies on sharing of resources to achieve coherence and economies of scale, like a public utility, while third-party clouds enable organizations to focus on their core businesses instead of expending resources on computer infrastructure and maintenance. The cloud may be communicatively coupled to wagering network 108 which may perform real time analysis on the type of play and the result of the play. The cloud may also be synchronized with game situational data, such as the time of the game, the score, location on the field, weather conditions, and the like which may affect the choice of play utilized. For example, in other exemplary embodiments, the cloud may not receive data gathered from sensors and may, instead, receive data from an alternative data feed, such as SPORTSRADAR. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include a wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, wagering network 108 may not receive data gathered from sensors and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can provide engaging promotions to the user.

Further, embodiments may utilize a user database 110 which contains data relevant to all users of the system, which may include, a user ID, a device identifier, a paired device identifier, wagering history, and wallet information for each user.

Further, embodiments may include an odds calculation module 112 which utilizes historical play data to calculate odds for in-play wagers.

Further, embodiments may utilize a historical plays database 114 that contains play data for the type of sport being played in live event 102. For example, in American football for optimal odds calculation, the historical play data should include meta data about the historical plays, such as time, location, weather, previous plays, opponent, physiological data, etc.

Further, embodiments may utilize an odds database 116 that contains the odds calculated by the odds calculation module, and the multipliers for distance and path deviation, and is used for reference by the base wagering module 118 and to take bets from the user through either the augmented reality device 128 or through the virtual reality device 130 and calculate the payouts to the user.

Further, embodiments may include a base wagering module 118 that allows the user to place wagers on individual events in the live event 102. The user may make a traditional wager on the event, such as wagering that the next play in an American football game will be a run instead of a pass. In this example the user is getting +150 odds on the run, meaning that for every $100 they wager, they will receive $150 if they win. The base wagering module 118 can also allow users who are interfacing with the wagering network 108 through an augmented reality (AR) device 128, or a virtual reality (VR) device 130, to add additional aspects to their wager. In this example the user could draw a path through the AR device 128 or the VR device 130, that designates the path and distance the running back will run on the play. These wagers can be made in a way in which the user may need to be correct on all of these aspects, such as in a parlay, or in a multiplier. In this example the multiplier is used in which the user has the base odds on the play, +150 for a run, then a multiplier for either or both of the distance of the play and the path the player takes. The user wagers on a run (+150), then draws a path off the right tackle and 10 yards past the line of scrimmage. The user will get an increase in their wager payout based on how close the actual play is to both the distance and the path the user predicted. The reality wagering module 120 is called when the AR/VR user which will allow the user to draw or act out their prediction for the path of the play, and if the user wins the initial bet, for example a runversus a pass, the wager adjustment module 122 is called to calculate how far from the total distance the user predicted the actual result is, and the average distance the actual play path was from the user predicted path. The resulting adjusted payout is then recorded in the wallet portion of the user database 110.

Further, embodiments may include a reality wagering module 120 through which the user can designate the wager they wish to make regarding the path of a participant or element of the live event 102. Users can designate a wager in any of a variety of manners, for example through the use of a gesture interface, controller, or the movement of the user, the user demonstrates the path and distance they want to add to or parlay with their wager.

Further, embodiments may include a wager adjustment module 122 through which the payout to users who have selected a path and distance to add to their wager are adjusted. The wager adjustment module 122 is only called when the user wins their initial bet. In this example, the user selected a pass, so the wager adjustment module 122 is only called by the base wagering module 118 if the play was a pass. In this example the user selected pass, so the wager adjustment module 122 will first determine how close the user's predicted distance is to the actual distance of the play. In this example the user had predicted that the pass play would travel ten yards past the line of scrimmage, and the actual play traveled eight yards past the line of scrimmage. In the present example, that means the user will get +50 added to their original payout odds, based on the multipliers in the odds database 116, bringing their total from +150 to +200. The path of the play predicted by the user is then compared to the actual path of the play. The average distance between the predicted path and the actual path are then compared to the multipliers in the odds database 116. In this example the predicted path was an average of 1.5 yards from the play path, resulting in the user getting +100 added to their original payout odds, bringing his total odds payout to +300 from the original +150. These adjustments are sent back to the base wagering module 118 for the payout to made to the user's account.

Further, embodiments may utilize a multiplier database 124 that is populated by the administrator of the wagering network, or by the odds calculation module 112, in which the available wager multipliers are stored. In this example, two types of multipliers are used. The first is for the distance past the line of scrimmage the user predicts the play will travel and the second is the average distance the user's predicted path of the player, or element of the live event 102, the actual path of the player or element takes on the play.

Further, embodiments may utilize a current wager database 126 that is populated by the reality wagering module 120 with the wager, including any multipliers the user has elected to wager upon.

Further, some embodiments include an augmented reality device 128 that allows the user to have an interactive experience with the real-world environment of the live event 102. There are numerous types of augmented reality devices 128 that are known in the art including handheld devices such as smartphones and tablets, as well smart glasses, head mounted displays, smart contact lenses, virtual retinal displays, etc. Additional devices not listed could be used if they combine the real and virtual worlds and allow for real-time interaction between the two. There are methods known in the art for overlaying additional information on a live sporting event with an augmented reality device 128, such as MLB at Bat.

Further, some embodiments include a virtual reality device 130 that allows the user to have a simulated experience that allows for real-time interaction with the live event 102. A virtual reality device 130 is typically a head mounted display that provides the user with realistic images, sounds, and other sensations that simulates the user's physical presence in a virtual representation of the live event 102. There are methods known in the art for integrating live sporting events into a virtual reality device, such as FOX Sports VR.

Figure 2:
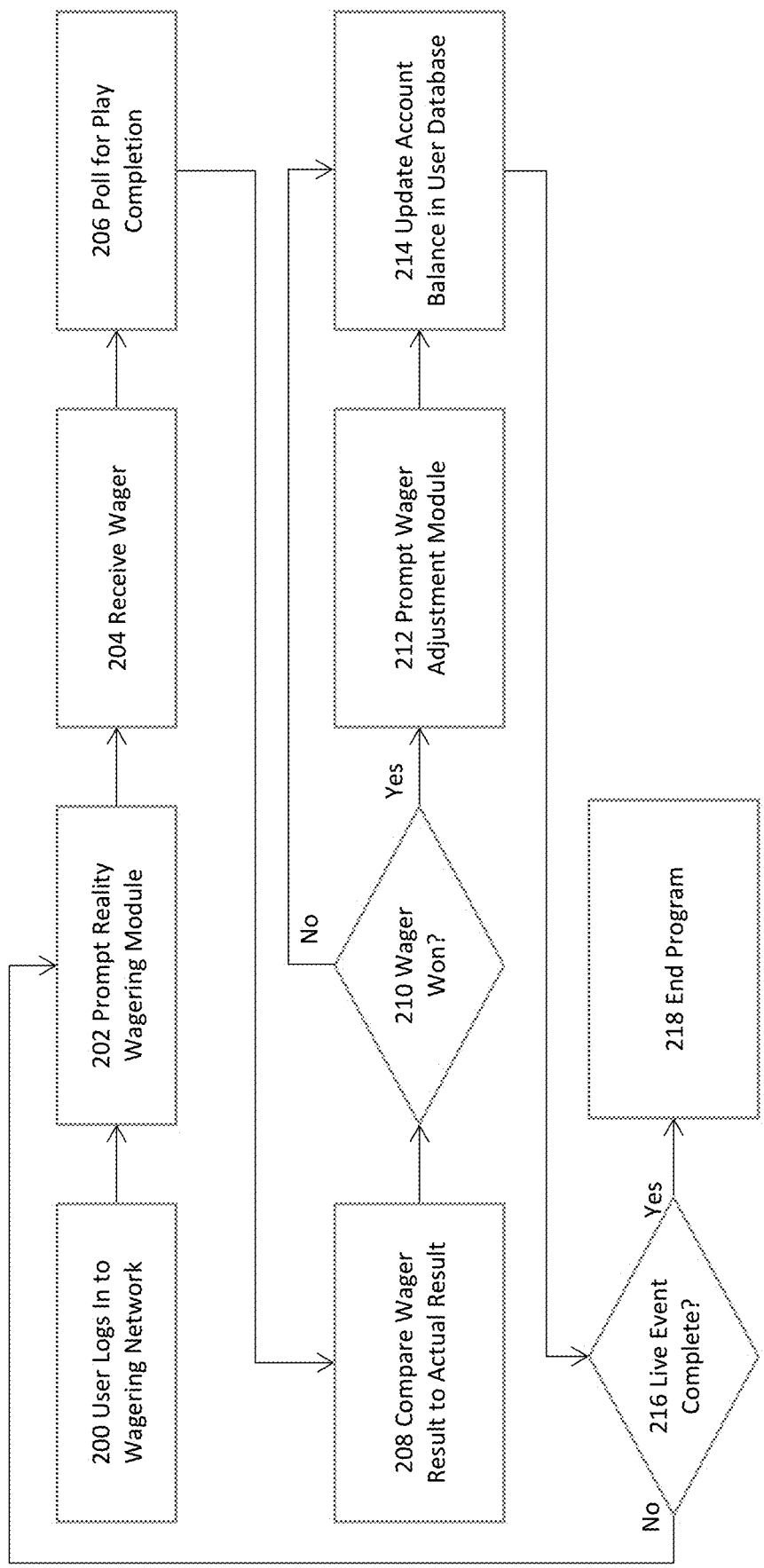
FIG. 2 illustrates a base wagering module, according to an embodiment.

FIG. 2 illustrates the base wagering module 118. The process begins with a user logging into the wagering network 118, at step 200. For users of either an AR device 128 or a VR device 130, the reality wagering module 120 is prompted, at step 202. The reality wagering module 120 will continue to adjust the display of wagers on the AR device 128 or the VR device 130 based on the user's point of view until the user places a wager. That wager is received, at step 204. The sensors 104 are then polled, at step 206 for the completion of the play wagered upon. For example, listening for the referee's whistle indicating the end of a play in an American football game. The actual result of the play compared, at step 208 to the wagered upon result. It is determined, at step 210 if the wager is won. If the wager is lost, the process goes to step 214 to deduct the user's wager amount from their account balance in the user database 110. If the wager is won, for example the pass was completed to the wide receiver the user predicted would catch the ball, the wager adjustment module 122 is prompted, at step 212. The total payout for the wager after determining if the user wagered on and/or won their multiplier bets, in this example multipliers for distance of the play and path of the wide receiver, is returned to the base wagering module 118 from the wager adjustment module 122. The user's account balance in the user database 110 is updated, at step 214 based on the original wager amount lost or the total payout won. If it is determined, at step 216 that the live event 102 is complete, the process will return to step 202 and prompt the reality wagering module 120 so as to receive additional wagers. When the live event 102 is complete the program ends, at step 218.

Figure 3:
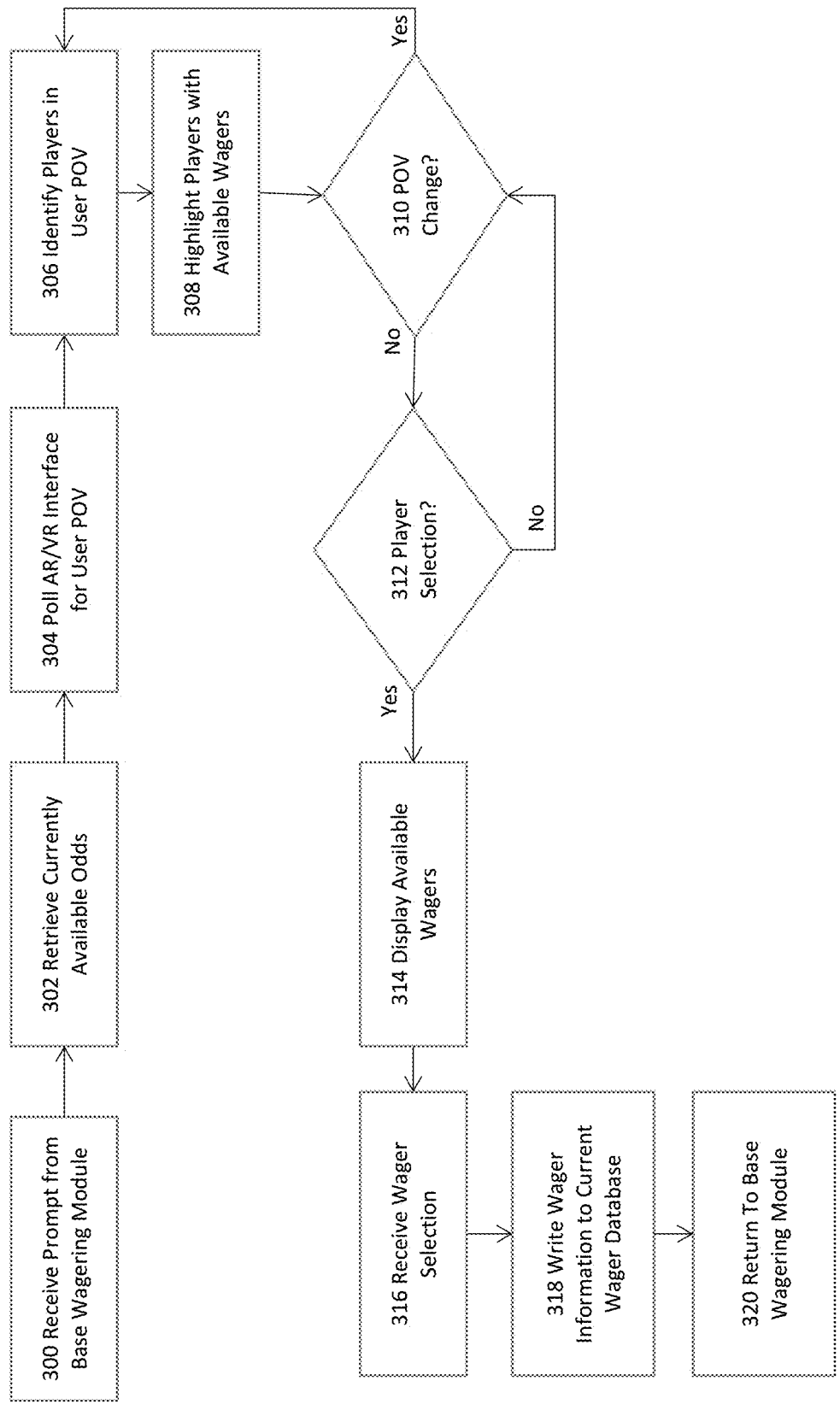
FIG. 3 illustrates a reality wagering module, according to an embodiment.

FIG. 3 illustrates the reality wagering module 120. The process begins with receiving a prompt, at step 300 from the base wagering module 118 that the user of either an augmented reality device 128 or a virtual reality device 130, has logged into the wagering network 108. The live event is rendered into a virtual space for the virtual reality device 130, in one of the methods known in the art, such as FOX Sports VR, NextVR, and Oculus Quest. The reality wagering module 120 then begins the process of integrating the display of wagers available through the wagering network 108 with the live event 102 by retrieving, at step 302 the odds on currently open wagers from the odds database 116. The AR device 128 or VR device 130 is then polled, at step 304, to determine the user's point of view of the live event 102. For example, two AR device 128 users are viewing the same American football game from the stands. User Joe Smith is seated on the 50-yard line on the second deck, providing a clear view of the entire field. User Bob Jones is seated at field level in the end zone currently being defended by the defense. His point of view obscures several offensive players from his AR device 128. The player(s) in the user's point of view are identified, at step 306. The player(s) who are a party to at least one currently available wager is highlighted, at step 308 on the AR device 128 or VR device 130. In this example there are five wagers currently available for the next play through the wagering network 108. The first is on the Green Bay Packers' quarterback throwing for a first down, the second is on the Green Bay Packers' running back running for a first down, and the third, fourth and fifth available wagers are on which of the Green Bay Packers' two wide receivers, or the running back, will catch the ball for a first down. In this example user Joe Smith, who's point of view encompasses the entire field and all the players on it, all available wagers are displayed over their respective players on his AR device 128. While user Bob Jones would only see the wagers available on the two Green Bay Packers wide receivers, that his AR device 128 can see, and not the three available wagers on the quarterback and the running back, who are obscured from view by the defensive players. In another embodiment, the user of a VR device 130 could move around on the field of play in and amongst the players. This would result in a constantly changing point of view that is polled for, at step 310. Users of AR devices 128 could also change their point of view during the live event 102. This will result in the reality wagering module 120 highlighting different players as the players move around the field and/or the user changes their point of view. This will continue until there is a player selection, at step 312. Once a player is chosen, the available wagers are displayed, at step 314. In this example the user Joe Smith is electing to wager that the Green Bay Packers wide receiver will catch the ball. That bet has +150 odds. User Joe Smith can make two additional wagers that will, in this example, result in multipliers to his payout. The first multiplier is the distance the play will travel. For example, user Joe Smith thinks the pass play will gain the Green Bay Packers eight yards. This distance predicted will be compared to the actual distance the play traveled, only if it is completed pass to the wide receiver selected, to determine if the user's payout is increased. The second multiplier is the average distance a path predicted by the user will be from the actual path a player will takes on that play. This path can be input by the user in a number of different methods that utilize the functionality of the AR device 128 and VR device 130. In this example, user Joe Smith is seated in the stands, at the fifty yard line, on the second tier, with a full view of the field and players, using his smartphone as an AR device 128 to place in play wagers on the game through the wagering network 108. He touches the wide receiver on his screen, selects his wager amount, and traces the path he predicts the wide receiver will take on his phone screen. If the user was utilizing a VR device 130 they could, for example, run the route they predict the wide receiver will take from that position on the field. The user's wager selection is received, at step 316. The user's selected wager is written, at step 318 to the current wager database 126. The base wagering module 118 is prompted, at step 320 that a user has made a wager.

Figure 4:
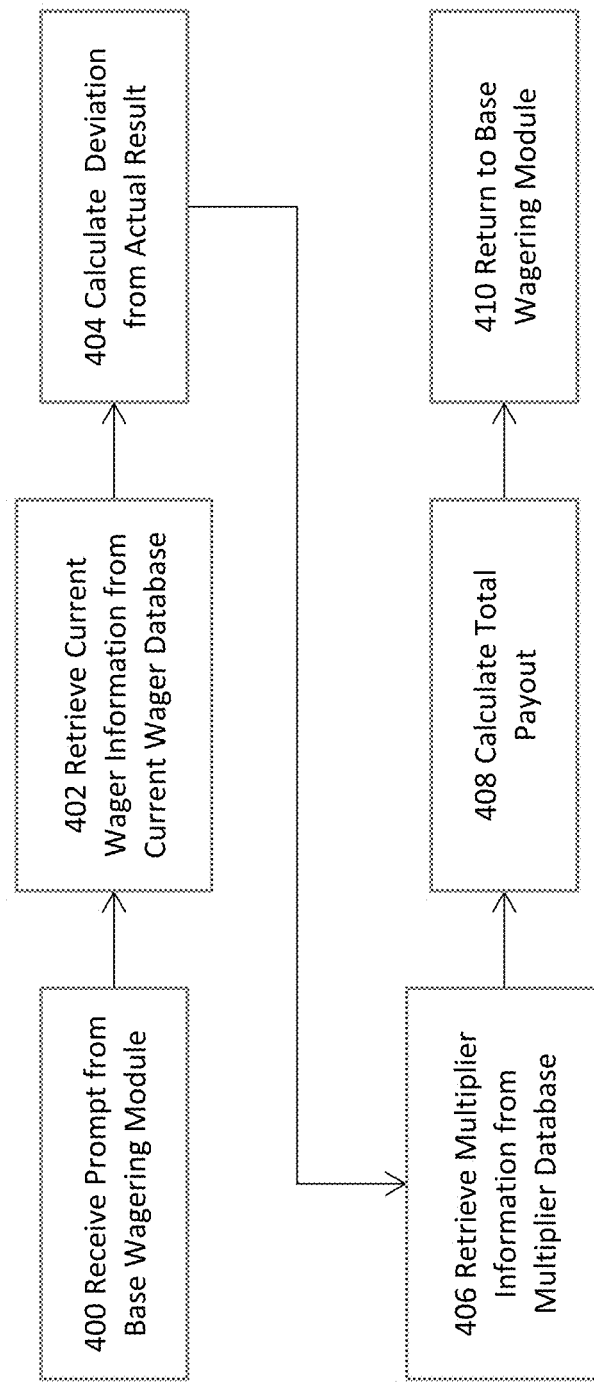
FIG. 4 illustrates a wager adjustment module, according to an embodiment.

FIG. 4 illustrates the wager adjustment module 122. The process begins with receiving, at step 400, a prompt from the base wagering module 118 that a user has won a wager, along with the actual play results. The current wager information, including the odds and the path/distance specified by the user is retrieved, at step 402 from the current wager database 126. In this example, user Joe Smith believes the wide receiver number 88 will run an out route, in which the receiver runs straight down the field for a distance of ten yards then makes a right angle turn towards the sideline. The wagering network is offering +150 odds on the pass outcome, meaning if user Joe Smith wins his $10 bet, he will be paid back $15, before the multipliers for his path and distance selection are applied. The path taken by the receiver in the actual play result is identified, in this example through video of the play, is compared to the path user Joe Smith predicted. The receiver had the same starting point in both the actual play and user Joe Smith's predicted path. In both the predicted path and the actual play, the wide receiver ran vertically upfield and made a left turn towards the sideline. The wide receiver made the left turn towards the sideline eight yards upfield. The deviation of the predicted path from the actual result, is calculated, at step 404. The deviation between the actual path and the predicted path could be compared in many different ways and be linked to one or more types of wager multipliers. In this embodiment the wagering network 108 is offering two multipliers for users of augmented reality devices 128 and virtual reality devices 130. One is the distance the play travels, and the second is the average distance the actual play deviated from the path predicted by the user. Those multipliers are retrieved, at step 406. The user Joe Smith had predicted that the pass play would travel ten yards past the line of scrimmage, and the actual play traveled eight yards past the line of scrimmage. In the present example, that means the user will get +50 added to their original payout odds, based on the multipliers in the multiplier database 124. The path of the play predicted by the user is then compared to the actual path of the play. The total payout is calculated, at step 408, when the average distance between the predicted path and the actual path are then compared to the multipliers in the multiplier database 124. In this example the predicted path was an average of 1.5 yards from the play path, resulting in the user Joe Smith getting +100 added to their original payout odds. The total payout to user Joe Smith is his $10 initial wager times his new odds total of +300 (original +150 plus +50 for the 2 yard difference in play length and plus +100 for the average distance between the predicted and actual path) is $30 on top of his initial wager. Once the payout is calculated that information is sent, at step 410 to the base wagering module 118.

FIG. 5 illustrates the multiplier database 124. The multiplier database 124 contains the wager multipliers available to AR and VR users of the wagering network 108. The reality wagering module 120 allows users to specify the path of the ball/player as an addition to a wager on the outcome of a single play. For example, in an American football game the user can wager that the next play will be a pass or a run. If, for example, the user wagered that the next play was going to be a run, they can also input through either the AR device 128 or the VR device 130 the path of the running back will carry the ball. The multiplier database 124 is used by the wager adjustment module 122 to increase the payout to the user if they predicted a path/distance, and they are under the multiplier thresholds. There are different thresholds for each play type, run, pass, etc., and each play type has multiple thresholds. For example, if the user predicted a pass of 10 yards and the actual distance of the pass was 8 yards, the user would get +50 added to their original wager odds for being less than 3 yards away from the actual distance of the play. Further, the user predicted the route of the wide receiver who catches the ball, but could also have predicted the flight path of the ball, and actual route of the wide receiver was an average of 1.5 yards from the path predicted by the user, the user gets an additional +100 added to their wager payout based on being less than 2 yards away from the path on average.

FIG. 6 illustrates the current wager database 126. The database contains current wagers made through the base wagering module 118 that have not yet been resolved. For example, in an American football game between the Chicago Bears and the Green Bay Packers, three users have made a wager on the 67th play of the game, where the Packers have the ball on the Bears 40 yard line, 3rd down and 7 with 5:15 remaining in the fourth quarter. Two of the three users think the next play will be a passing play, and two of the three users have elected to specify the route and distance a player will travel. User Joe Smith believes the wide receiver number 88 will run an out route, in which the receiver runs straight down the field for a distance of ten yards then makes a right angle turn towards the sideline. The wagering network is offering +150 odds on the pass outcome, meaning if user Joe Smith wins his $10 bet, he will be paid back $15, before the multipliers for his path and distance selection are applied. Frank Jones also believes the play will result in a pass but has elected not to select a path or distance to be eligible for multipliers on his wager. User Frank Jones wagered $50 on this outcome at +150 odds, meaning he will win $75 if the actual play results match his wager. User Susan Robinson believes the play will be a run and has specified a route distance the that will be traveled by the running back number 23. The +300 odds on this outcome mean that user Susan Robinson will be paid out $300 on her $100 wager if the actual outcome matches her wager. The path specified by the user is stored as a datafile in this example so as to allow the wager adjustment module to compare the path specified by the user to the path taken by the player or ball in the actual play. Once a play is completed and the result of the play is compared to all current wagers and the account balance of each user who wagered on the play is updated based on the result of the play, the user's wager and the odds on that wager. The database content is then cleared or archived in a database of prior wagers that is kept for auditing purposes.

The foregoing description and accompanying figures illustrate the principles, preferred embodiments and modes of operation of those embodiments. However, the embodiments should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A system for wagering on a path of a player or object in a field of play during a single play of a live event through at least one of an augmented reality or virtual reality device, comprising:
   a wagering network that hosts in-play wagering on live sporting events;
   at least one of a virtual reality or augmented reality device;
   a live sporting event, wherein the live sporting event is displayed through the device;
   wherein at least two wagers are provided by the wagering network for a single play in the live event and available wagers are filtered by the point of view of the at least one virtual reality or augmented reality device;
   a selection of an initial wager by a user of the at least one virtual reality or augmented reality device based on at least one of the at least two wagers provided
   at least one additional wager is provided based on the initial wager and one or more actions of one or more elements in the live event;
   a display of a wager by the user of the at least one virtual reality or augmented reality device based on a predicted action, by the user, of the one or more elements in the live action event; and
   a comparison of flail the predicted action of the one or more elements to an actual action in the live event and payment for a successful wager,
   wherein a placed wager is determined to be successful based on a deviation of the predicted action to the actual action at the conclusion of at least one event of the live sporting event.

2. The system of claim 1, wherein the one or more elements comprise one or more players participating in the live event or one or more objects used to participate in the live event.

3. The system of claim 1, wherein the derivation of the predicted action to the actual action provides one or more odds multipliers for the placed wager.

4. The system of claim 3, wherein the odds multipliers are tiered based upon the derivation of the predicted action to the actual action.

5. The system of claim 1, wherein, if the derivation of the predicted action to the actual action is above a predetermined threshold, the placed wager is determined to be unsuccessful.

6. The system of claim 1, wherein availability the filtered wagers are determined based on data specific to the live event.

7. The system of claim 6, wherein the live event is a game and the filtered wagers are associated with players playing the game.

8. An augmented and/or virtual reality wagering device, comprising:
   a mobile device running augmented and/or virtual reality software;
   one or more elements participating in a live event;
   a display of one or more wagering options in augmented and/or virtual reality based on the point of view of the mobile device with respect to the live event and the one or more elements participating in the live event;
   a display of a first wagering option associated with a first element participating in the live event based on the point of view of the mobile device;
   a display of a second wagering option associated with the first element participating in the live event, wherein the second wagering option is provided after the first wagering option is selected, and wherein the second wagering option comprises a prediction of at least one action, by the user, of the first element participating in the live event; and
   a wagering module that facilitates placement of wagers on the first wagering option and the second wagering option by a user of the mobile device for the live event.

9. The device of claim 8, further comprising an interface to wager on one of more of the one or more of wagering options available.

10. The device of claim 8, further comprising a successful wager determination for the second wagering option if, following the placement of the second wager, a determination of a derivation of actual action of the first element participating in the live event to the predicted action of the first element made in the second wager is less than a predetermined threshold.

11. The device of claim 10, further comprising one or more odds multipliers provided for the second wager based on the derivation of the actual action of the element to the predicted action of the element.

* * * * *